United States Patent [19]

Gross et al.

[11] Patent Number: 5,165,997
[45] Date of Patent: Nov. 24, 1992

[54] COATING FOR FILLER MATERIAL USED IN A HARDENABLE MATERIAL

[75] Inventors: Ioan Gross, Augsburg; Hans-Jürgen Irmscher, Landsberg, both of Fed. Rep. of Germany

[73] Assignee: Hilit Aktiengesellschaft, Furstentum, Liechtenstein

[21] Appl. No.: 495,454

[22] Filed: Mar. 16, 1990

[30] Foreign Application Priority Data

Mar. 29, 1989 [DE] Fed. Rep. of Germany ....... 3910105

[51] Int. Cl.$^5$ .............................................. B32B 18/00
[52] U.S. Cl. ................................... 428/404; 428/403; 428/405; 428/406; 427/214; 427/219
[58] Field of Search ............... 428/403, 404, 406, 405; 427/214, 219

[56] References Cited

U.S. PATENT DOCUMENTS 4,154,774  5/1979  Hinterwaldner .................... 260/862

OTHER PUBLICATIONS

Rompps Chemie-Lexikon, Dr. Otto-Albrecht Neumüller, 1979, p. 408.

*Primary Examiner*—Paul J. Thibodeau
*Assistant Examiner*—Mark Forman
*Attorney, Agent, or Firm*—Anderson Kill Olick & Oshinsky

[57] ABSTRACT

In a two-component system for a hardenable material, quartz grains (1) serve as a filler material and are coated with benzoyl peroxide which forms the hardener component of the system. The benzoyl-peroxide coated quartz grains are enclosed in a protective layer of pyrogenic silicic acid. As a result, the flotation capability of the quartz granules is maintained.

3 Claims, 1 Drawing Sheet

COATING FOR FILLER MATERIAL USED IN A HARDENABLE MATERIAL

BACKGROUND OF THE INVENTION

The invention is directed to a coating for quartz grains or granules used as a filler material for a two-component system hardenable material. The quartz grains are coated with benzoyl peroxide and then with a protective layer covering the coating.

Two-component systems for hardenable material are composed of a resin component and a hardener component, with the components being kept separately and mixed together only when the material is to be used. In a preferred embodiment of the hardenable material, a filler material of quartz grains coated with the hardener component is used.

In a known process, the quartz grains are coated by dissolving granulated polystyrol in toluol and, subsequently, benzoyl peroxide with the quartz grains being added by weight. The toluol is evaporated by subsequent stirring and the blowing-in of air. As a result, the quartz grains are coated in a peroxide layer embedded in polystyrol. This known method is relatively time-consuming, since it requires one to two hours, depending upon the size of the mixer. A further disadvantage is that the toluol released during the coating process must be drawn off and subsequently burned.

SUMMARY OF THE INVENTION

Therefore, the primary object of the present invention is to provide quartz grains coated with benzoyl peroxide in a simplified process.

In the present invention, a protective layer is provided on the coated quartz grains with the layer comprising a pyrogenic silicic acid.

There is the advantage of the present invention that the previously used solvent toluol can be eliminated. The coating process is considerably less harmful to the environment as compared to the known processes and, in addition, the flotation capability of the quartz grains or granules is maintained.

In the process of coating quartz grains, in accordance with the present invention, initially the quartz grains are mixed into benzoyl peroxide in a liquid or pasty state so that the grains are coated and then, by adding pyrogenic silicic acid, prior to the termination of the mixing process, a protective layer is deposited on the coated grains.

Preferably, the mixing process for completing one charge takes 10 to 20 minutes. Compared to the known processes, requiring 1 to 2 hours, there is a considerable time savings. In addition to eliminating the solvent toluol, there is the additional economical advantage of the reduction in the fabrication costs.

The amount of the pyrogenic silicic acid, as compared to the over-all mass amount of the coated grains, is approximately a maximum of 5% by weight. In view of the amount of pyrogenic silicic acid used, the costs are quite low. An essential advantage is the capability of coating the quartz grains without the use of solvents and avoiding the liberation or release of environmentally harmful vapors.

The various features of novelty which characterize the invention are pointed out with particularity in the claims annexed to and forming a part of this disclosure.

For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
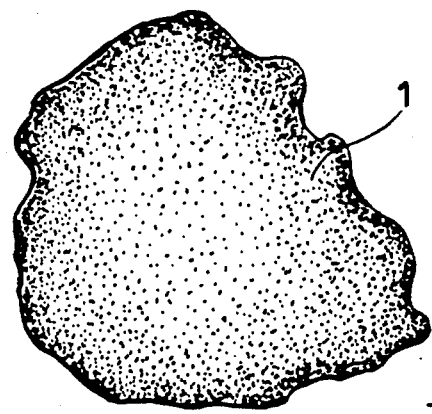
FIG. 1 illustrates an uncoated quartz grain.

In FIG. 1, an individual quartz grain 1 is shown without any coating or covering.

Figure 2:
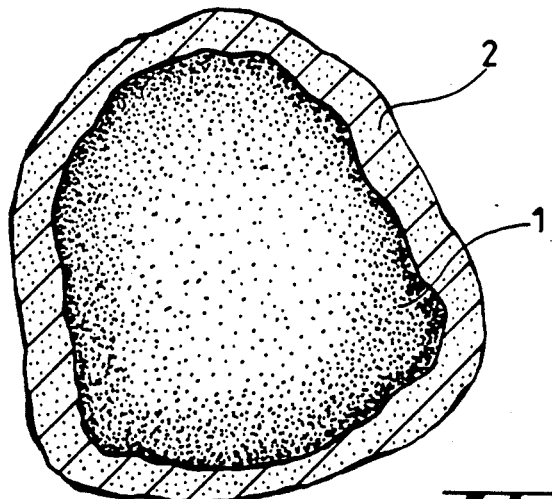
FIG. 2 shows a quartz grain with a benzoyl peroxide coating.

FIG. 2 shows a quartz grain provided with a benzoyl peroxide coating by dipping the grains into benzoyl peroxide in a liquid or pasty state. The benzoyl peroxide coating 2 serves as a hardening component for a two-component system hardenable material.

Figure 3:
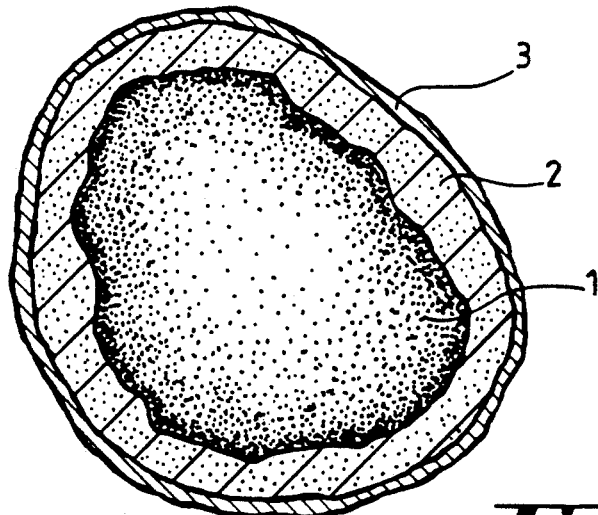
FIG. 3 displays a quartz grain coated with benzoyl peroxide, with the coating enclosed by a layer of pyrogenic silicic acid.

In FIG. 3, a quartz grain 1 is displayed with a benzoyl peroxide coating 2 and, in turn, the surface of the coating 2 is covered with a protective layer 3 formed of pyrogenic silicic acid. The protective layer 3 prevents individual quartz grains 1 from sticking to one another and affords a floatation capability for a batch of the quartz grains 1.

Initially, the quartz grains 1 are mixed into benzoyl peroxide to provide the coating 2, with the coating taking place during a mixing operation. Before the end of the mixing operation, the pyrogenic silicic acid is introduced for covering the coated quartz grains 1 with the protective layer 3.

While specific embodiments of the invention have been shown and described in detail to illustrate the application of the inventive principles, it will be understood that the invention may be embodied otherwise without departing from such principles.

We claim:

1. In coated quartz grains for use as filler material in a two-component system hardenable material wherein quartz grains (1) are coated with benzoyl peroxide (2) and a protective layer (3) encloses the coated quartz grains wherein the improvement comprises that initially the quartz grains are mixed into the benzoyl peroxide in one of a liquid and pasty state free of toluol, and said protective layer comprises pyrogenic silicic acid where the amount of pyrogenic silicic acid compared to the overall mass amount of the coated grains is a maximum of 5% by weight.

2. Method of coating quartz grains comprising the steps of placing and mixing quartz grains in benzoyl peroxide in one of a liquid and pasty state free of toluol, and prior to the termination of the mixing step, adding pyrogenic silicic acid and covering the coated quartz granules with a protective layer of the pyrogenic silicic acid where the amount of pyrogenic silicic acid compared to the overall mass amount of the coated grains is a maximum of 5% by weight.

3. Method, as set forth in claim 2, wherein the mixing step is carried out in 10 to 20 minutes.

* * * * *